United States Patent
Lukacs, III et al.

(10) Patent No.: US 6,652,978 B2
(45) Date of Patent: Nov. 25, 2003

(54) THERMALLY STABLE, MOISTURE CURABLE POLYSILAZANES AND POLYSILOXAZANES

(75) Inventors: Alexander Lukacs, III, Wayne, PA (US); Gary J. Knasiak, Columbus, OH (US)

(73) Assignee: Kion Corporation, Huntingdon Valley, PA (US)

( * ) Notice: Subject to any disclaimer, the term of this patent is extended or adjusted under 35 U.S.C. 154(b) by 0 days.

(21) Appl. No.: 10/075,729

(22) Filed: Feb. 14, 2002

(65) Prior Publication Data

US 2003/0083453 A1 May 1, 2003

Related U.S. Application Data

(60) Provisional application No. 60/289,067, filed on May 7, 2001.

(51) Int. Cl.$^7$ .................. B32B 25/20; B32B 13/04; C08G 77/54; C08G 77/62
(52) U.S. Cl. .................. 428/450; 428/446; 428/447; 427/387; 524/588; 528/33; 528/34; 528/38; 528/901; 556/412; 106/287.11
(58) Field of Search .................. 427/387; 428/444, 428/447, 450; 524/588; 528/33, 34, 38, 701; 556/412; 106/287.11

(56) References Cited

U.S. PATENT DOCUMENTS

| | | | |
|---|---|---|---|
| 4,277,284 A | | 7/1981 | Ginsberg et al. .......... 106/1.05 |
| 4,525,566 A | | 6/1985 | Homan et al. .............. 528/17 |
| 4,571,268 A | | 2/1986 | Frain et al. ............... 106/1.17 |
| 4,593,085 A | * | 6/1986 | Lucas ........................ 528/18 |
| 4,720,531 A | * | 1/1988 | Chung et al. ................ 528/18 |
| 4,810,293 A | | 3/1989 | Sano ...................... 106/14.21 |
| 4,847,400 A | * | 7/1989 | Krahnke et al. ............ 556/412 |
| 5,008,422 A | * | 4/1991 | Blum et al. ................ 556/412 |
| 5,208,300 A | | 5/1993 | Krahnke et al. ............ 525/474 |
| 5,371,164 A | * | 12/1994 | Kobayashi et al. ........... 528/18 |
| 5,405,655 A | | 4/1995 | Blum et al. ................ 427/387 |
| 5,413,628 A | | 5/1995 | Savin ..................... 106/14.44 |
| 5,508,360 A | | 4/1996 | Cifuentes et al. ........... 525/477 |
| 5,777,144 A | * | 7/1998 | Rubinsztajn et al. ........ 556/407 |
| 5,840,794 A | | 11/1998 | Palmer ..................... 524/425 |
| 5,895,713 A | | 4/1999 | Miyazaki et al. ........... 428/335 |
| 5,919,572 A | | 7/1999 | Blum et al. ................ 428/446 |
| 6,329,487 B1 | | 12/2001 | Abel et al. .................. 528/21 |

* cited by examiner

*Primary Examiner*—Jeffrey B. Robertson
(74) *Attorney, Agent, or Firm*—Howard M. Ellis

(57) ABSTRACT

Surfaces of various types of substrates, including glass, ceramics, and metals, are rendered stable to heat and corrosion by treatment with a silicon-containing polymer which may be an alkoxy silyl substituted polysilazane or an alkoxy silyl substituted polysiloxazane. Polymeric coatings of the compositions may be cured at room temperature to about 50° C. in an atmosphere containing moisture without requiring the introduction of a catalytic curing agent.

48 Claims, No Drawings

THERMALLY STABLE, MOISTURE CURABLE POLYSILAZANES AND POLYSILOXAZANES

CROSS-REFERENCE TO RELATED APPLICATION

This application claims the benefit of U.S. Provisional application No. 60/289,067, filed May 7, 2001.

TECHNICAL FIELD

This invention relates generally to silicon containing polymers and methods of making, and more particularly, to coating compositions comprising selected substituted polysilazanes and substituted polysiloxazanes which moisture cure at room temperature without requiring a catalyst. The coatings are thermally stable, and in the case of metal substrates, are corrosion-resistant as well. In some cases, the coatings may also be nonwetting. The invention additionally encompasses methods of preparing coated substrates having the aforementioned properties.

BACKGROUND OF THE INVENTION

A variety of resin systems undergoing moisture cure at ambient temperature conditions have been prepared heretofore. Other than polysilazanes and polysiloxazanes, many employed the hydrolytic sensitivity of isocyanate groups and alkoxy silyl groups to induce room temperature moisture cure. Resin systems utilizing alkoxy silyl groups have been particularly successful. The vast majority of these systems employ tetra-alkoxysilanes (orthosilicates) or oligomers of tetra-alkoxysilanes as moisture curable alkoxy silanes.

One representative example is U.S. Pat. No. 5,413,628 to Savin, which teaches a moisture curable composition comprising an alkyl silicate as a film forming substance, zinc powder, zinc flakes, amorphous silica, and ferrophosphate, wherein the alkyl silicate comprises from about 5% to 20% of tetraethyl orthosilicate.

U.S. Pat. No. 4,810,293 to Sano discloses an anticorrosive paint composition containing a hydrolyzed condensate of tetraalkoxy silicate, zinc dust, and titanium oxide which undergoes a moisture cure.

U.S. Pat. No. 4,277,284 to Ginsberg et al. discloses a single-package, moisture curable zinc-rich coating composition utilizing zinc, a partially-hydrolyzed organic silicate and an aminosilane.

U.S. Pat. No. 4,571,268 to Frain et al., discloses a single package, moisture curable zinc-filled coating comprising a mixture of partially hydrolyzed ethyl silicate with large amounts of metal particles, such as zinc dust in an organic solvent with an alkali metal nitrate as the catalyst.

U.S. Pat. No. 5,508,360 to Cifuentes et al., discloses a silicon pressure-sensitive adhesive composition curable upon exposure to ambient moisture comprising an organopolysiloxane resin which is appended by alkoxy or oximino radicals.

U.S. Pat. No. 4,525,566 to Homan et al., discloses a moisture-curable silicone composition for adhesive-release coatings comprising an alkoxysilylorganosiloxane, a titanium ester and an aminoorganosiloxane.

U.S. Pat. No. 5,840,794 to Palmer, discloses an RTV sealant composition of a polymer with silicon-containing end groups with at least two silicon-bonded alkoxy groups and a titanium catalyst.

U.S. Pat. No. 5,208,300 to Krahnke et al., discloses silicone pressure sensitive adhesive compositions which are stable in the absence of moisture, but which cure in the presence of moisture comprising an adhesive component bearing alkoxy curing radicals and, optionally, a catalyst to accelerate the reaction of moisture with the alkoxy radicals to form siloxane bonds.

U.S. Pat. No. 5,895,713 to Miyazaki et al., discloses a method for treating an outdoor article, wherein a surface treating agent comprising a medium containing a tetraalkoxysilane or a silane compound having a silanol group obtained by hydrolyzing an oligomer of such a tetraalkoxy silane is used in a moisture curable coating composition.

While polysilazane and polysiloxazane resins have been used to provide coatings with good thermal stability and nonwetting properties, including oxidation and corrosion resistance to metal substrates, most were not moisture curable. Other polysilazanes and polysiloxazane resins provided adherent, protective coatings, but required added catalyst or activator in order to become moisture curable at ambient temperatures.

U.S. Pat. Nos. 5,405,655 and 5,919,572 to Blum et al. disclose certain polysilazane, polysiloxane and polysiloxazane coatings which can be made to undergo cure in the presence of an oxygen donor, such as water with the addition of a ruthenium catalyst. The mechanism of cure does not utilize alkoxy silyl groups as reactive moieties to effect the moisture cure, but rather relies on the activation of Si—H, N—H, and OH bonds by the metal catalyst to promote crosslinking reactions.

Accordingly, there is a need for silicon-containing polymers which are useful in preparing improved coatings which meet the foregoing criteria, i.e., moisture curable at ambient temperature conditions without requiring added catalyst or activator for rapid curing; wherein the coatings possess desirable properties, namely adherent, protective and heat-stable, while displaying excellent hardness, remain intact even when the substrate is deformed, all with good corrosion resistance over time. Additionally, the silicon polymer-containing coating compositions could be nonwetting.

SUMMARY OF THE INVENTION

It has been discovered that novel silazane and siloxazane polymers with selectively substituted alkoxy silyl groups or mixtures of such groups can be employed as resins in coating compositions, wherein the polymers are capable of undergoing rapid moisture cure at room temperature conditions without requiring added catalyst. These moisture curable substituted silazane and siloxazane polymeric coatings not only have protective properties, e.g., corrosion resistance, but provide hard, durable coatings with excellent thermal stability while displaying good adhesion properties to a wide range of substrates.

The silicon-containing polymers are alkoxy silyl substituted silazanes and siloxazanes of the formula:

wherein Z is any silazane or siloxazane polymer and A is an alkoxy silyl group of the formula:

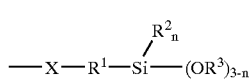

wherein
X is bonded to a silicon atom of Z and is either O or =$NR^4$ wherein $R^4$ is a member selected from the group consisting of hydrogen, lower alkyl, lower alkenyl, aryl, lower alkoxy, silyl, siloxyl and silazanyl;

$R^1$ is alkylene or alkylene substituted with a heteroatom;

$R^2$ is a member selected from the group consisting of
  (i) hydrogen,
  (ii) hydroxyl,
  (iii) C1 to C10 alkyl, either unsubstituted or substituted with hydroxyl, lower alkoxy, lower alkenyl, silyl and —N($R^5$)$_2$ where $R^5$ is independently selected from the group consisting of hydrogen, lower alkyl and lower alkenyl,
  (iv) C1 to C10 alkenyl, either unsubstituted or substituted with hydroxyl, lower alkoxy, silyl and —N($R^5$)$_2$, and
  (v) aryl of 1 or 2 rings, unsubstituted or substituted with hydroxyl, lower alkyl, lower alkenyl, lower alkoxy, silyl and —N($R^5$)$_2$, $R^3$ is the same as (iii), (iv) or (v);

n=0, 1 or 2, and the ratio of the total number of $OR^3$ groups of A to Si—N bonds in Z is generally from about 0.05 to about 2.5, preferably from about 0.1 to about 1.0, and most preferably from about 0.1 to about 0.50.

Generally, the novel substituted silazane and siloxazane polymers, Z—A, as disclosed hereinabove, are prepared by the reaction of preformed silazane or siloxazane polymers with certain reagents having reactive amine, ester or hydroxyl functionalities. The novel alkoxy silyl substituted polysilazanes and polysiloxazanes are prepared by heating a mixture of an alkoxy silyl reagent with the chosen polysilazanes or polysiloxazanes in the desired ratio, with the proviso that the ratio of the total number of $OR^3$ groups of A to Si—N bonds in Z, i.e., silazane or siloxazane polymer, prepared by the reaction is from about 0.05 to about 2.5, and preferably from about 0.1 to about 1.0, and most preferably from about 0.1 to about 0.50

The resulting substituted polysilazane or polysiloxazane can then be coated onto a substrate from solution or without the use of a solvent, depending on the physical form of the coating resin. For solid resins and liquid resins which have high viscosity, solvent coating is preferred; for liquid resins having low viscosity, a solventless coating method is preferred.

Coatings prepared by this method are cured in an atmosphere which promotes crosslinking of the polymer by its reaction with moisture. These curing atmospheres include, but are not limited to air and other non-reactive or reactive gaseous environments which contain moisture, such as inert gases like nitrogen and argon, and reactive gases such as ammonia, hydrogen, carbon monoxide, and the like. Rapid cure times are achieved using this method when the applied coatings are exposed to the moisture-containing atmosphere at room temperature.

The cured coatings of the present invention may be used in a wide variety of contexts, insofar as they protect virtually any type of substrate, but particularly metal substrates from oxidative thermal degradation, corrosion, or chemical attack. Additionally, such coatings can also have nonwetting properties, and can be useful in a variety of applications where release characteristics are desirable.

Thus, one principal object of the invention is to provide moisture curable coatings and compositions characterized by thermal stability and corrosion resistance.

It is a further object of the invention to provide coatings of silicon containing polymers with thermal stability properties and, in the case of metal substrates, corrosion resistance.

A further object of the invention is to provide a method of making alkoxy silyl substituted polysilazanes and polysiloxazanes.

It is yet another object of the invention to provide a method for coating substrates with the thermally stable and, in the case of metal substrates, corrosion resistant coatings.

Still another principal object of the invention is to provide coated substrates with protective coatings which are thermally stable and, in the case of metal substrates, corrosion resistant.

DESCRIPTION OF THE PREFERRED EMBODIMENTS

In this specification and in the claims which follow, reference will be made to a number of terms and expressions which shall be defined to have the following meanings:

The expression "corrosion resistant" or variation thereof as appearing in the specification and claims refers to coatings on a metal substrate which inhibit the corrosion of the metal substrate when it is exposed to air, heat, or corrosive environments for prolonged time periods.

The term "nonwetting" as used herein refers to a substrate surface having a high contact angle with a liquid, typically greater than 90°. In preferred embodiments, "nonwetting" refers to nonwetting characteristics with water.

The term "alkyl" as used herein refers to a branched, unbranched or cyclic saturated hydrocarbon groups having from 1 to 26 carbon atoms, such as methyl, ethyl, n-propyl, isopropyl, n-butyl, isobutyl, t-butyl, octyl, decyl, tetradecyl, hexadecyl, eicosyl, tetracosyl, and so on. Preferred alkyl groups herein contain 1 to 10, and most preferred from 1 to 8 carbon atoms.

The expression "lower alkyl" as appearing in the specification and claims is intended to embrace alkyl groups ranging generally from 1 to 6 carbon atoms, and more preferably, 1 to 4 carbon atoms. The alkyl groups present on the polymers described herein may be unsubstituted or substituted with one or more functional groups, e.g., halogen, alkoxy, hydroxyl, or the like.

The term "alkylene" as used herein refers to difunctional saturated branched or unbranched hydrocarbon chains containing from 1 to about 26 carbon atoms, which may be unsubstituted or substituted with various heteroatom containing moieties.

"Lower alkylene" as appearing in the specification and claims is intended to refer to alkylene linkages containing from 1 to 6 carbon atoms, and includes such representative examples as methylene (—CH$_2$—), ethylene (—CH$_2$—CH$_2$—), propylene(—CH$_2$CH$_2$CH$_2$—), 2-methylpropylene (—CH$_2$ CH(CH$_3$)CH$_2$)—hexylene (—(CH$_2$)$_6$—) and the like, either unsubstituted or "heteroatom" group substituted as defined below.

"Heteroatom" is intended to mean oxygen, nitrogen, sulfur, phosphorus or other elements which are not carbon or hydrogen.

"Alkylene substituted with a heteroatom" as appearing herein is intended to mean heteroatom substitution which may be external to the alkylene hydrocarbon chain or internal to the hydrocarbon chain. 2-hydroxypropyl (—CH$_2$CHOHCH$_2$—), for example, constitutes heteroatom substitution which is external to the alkylene hydrocarbon chain, since carbon bond catenation in the alkylene chain is unbroken by the heteroatom substituent. The alkylene group (—CH$_2$CH$_2$NHCH$_2$—), however, would constitute heteroatom substitution which is internal to the alkylene hydrocarbon chain, since carbon bond catenation is interrupted by the incorporation of N—C bonds in the alkylene chain.

The term "alkoxy" is intended to refer to alkyl groups as defined above bound through an ether linkage, typically to a silicon atom.

"Lower alkoxy" refers to an alkyl-oxygen group containing from 1 to about 6 carbon atoms, and more preferably, from 1 to about 4 carbon atoms.

The term "aryl" as used herein refers to an aromatic species having 1 to 3 ring structures, which may be carbocyclic, heterocyclic, monocyclic or polycyclic, e.g., bicyclic moiety, e.g., phenyl or 1- or 2-naphthyl groups. Optionally, these groups are substituted with 1 to about 4, and more preferably, 1 or 2 lower alkyl, lower alkoxy, hydroxy, amino, and/or nitro substituents.

The term "amino" as appearing herein is intended to mean an amino group —$NR_2$ where R is independently selected from hydrogen or an alternative substituent, typically lower alkyl. The term "amino" is thus intended to include primary amino —$NH_2$, "alkylamino" (i.e., a secondary amino group containing a single alkyl substituent), and "dialkylamino" (i.e., a tertiary amino group containing, for example, two alkyl substituents).

"Halo" or "halogen" is intended to include fluoro, chloro, bromo or iodo, and often relates to substitution for a hydrogen atom.

"Silazanes" as appearing in the specification and claims is intended to include compounds which contain one or more silicon-nitrogen bonds in which the nitrogen atom is bonded to at least two silicon atoms, and may or may not contain cyclic units. The terms "polysilazane" and "silazane polymer" are intended to include oligomeric and polymeric silazanes, i.e., compounds which include two or more monomeric silazane units.

"Siloxazane" as used herein means compounds which contain one or more silicon-oxygen bonds in which the oxygen atom is bonded to two silicon atoms, plus one or more silicon-nitrogen bonds in which the nitrogen atom is bonded to two or three silicon atoms, and may, or may not contain cyclic units. Thus, the expressions "polysiloxazane" and "siloxazane polymer" are intended to include oligomeric and polymeric silazanes, i.e., compounds which include two or more monomeric silazane units, as well as two or more monomeric siloxane units.

The term, "silyl," unless otherwise specified, includes $R_3Si$—, $R_2HSi$—, where R is independently selected from the group consisting of hydrogen, alkyl, alkenyl, aryl and silyl; $H_3Si$—, siloxyl, siloxazyl, and silazyl, and further, includes repeating silyl units, or "polysilyl" species.

These inventors discovered that selectively substituted silazane and siloxazane polymers comprising alkoxy silyl substituents can be employed as coating resins which undergo rapid moisture cure at room temperature without the need for added catalyst. The selectively substituted silazane and siloxazane polymers of this invention are those wherein the ratio of the total number of $OR^3$ groups of A to Si—N bonds in Z is generally from about 0.05 to about 2.5, preferably from about 0.1 to about 1.0, and most preferably from about 0.1 to about 0.50.

The novel substituted silazane and siloxazane polymers are prepared by the reaction of a preformed silazane or siloxazane polymers with reagents having reactive amine or hydroxyl functionality of the structural formula:

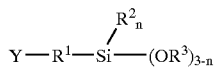

wherein
Y is either OH, $OCOR^6$, or $NHR^6$ where $R^6$ is a member selected from the group consisting of hydrogen, C1 to C8 alkyl, C1 to C8 alkenyl, lower alkoxy, aryl and silyl;
$R^1$ is alkylene or alkylene substituted with a heteroatom;
$R^2$ is selected from the group consisting of
(i) hydrogen,
(ii) hydroxyl,
(iii) C1 to C10 alkyl, either unsubstituted or substituted with hydroxyl, lower alkoxy, lower alkenyl, silyl and —$NR^5$ where $R^5$ is independently selected from the group consisting of hydrogen, lower alkyl and lower alkenyl,
(iv) C1 to C10 alkenyl, either unsubstituted or substituted with hydroxyl, lower alkoxy, silyl and —$NR^5$, and
(v) aryl of 1 or 2 rings, unsubstituted or substituted with hydroxyl, lower alkyl, lower alkenyl, lower alkoxy, silyl and —$NR^5$,
$R^3$ is the same as (iii), (iv) or (v);
n=0, 1 or 2.

The alkoxy silyl substituted polysilazanes and polysiloxazanes of the present invention resulting from the reaction of the alkoxy silyl reagents described above with polysilazanes, polysiloxazanes, or mixtures thereof comprise:

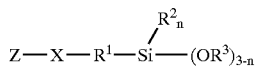

wherein Z is the preformed silazane or siloxazane polymer and X is bonded to a silicon atom of Z, and the values for X, $R^1$, $R^2$, $R^3$ and n of the alkoxy silyl group are the same as disclosed hereinabove.

The base ingredients in the inventive compositions include preformed polysilazanes and polysiloxazanes. Any polysilazane known in the art or commercially available having repeating units of Si—N linkages, including mixtures of polysilazanes can be used to prepare the novel alkoxy silyl substituted compositions of the invention. Similarly, any known or commercially available polysiloxazane and mixtures thereof can be used to prepare the compositions. The alkoxy silyl substituted coating compositions may also be prepared with heterogeneous mixtures containing both preformed silazane and siloxazane polymers.

As stated above, "polysilazane" as appearing herein is intended to include any oligomeric or polymeric composition. In addition, the term "polysilazane" denotes a compound which includes one or more Si—N units in which the nitrogen atoms are bonded to at least two silicon atoms. By "oligomer" is also intended to mean a molecule or chemical compound comprising several repeat units, generally from about 2 to 10 repeat units. "Polymer", as used herein, means a molecule or compound which comprises a large number of repeat units, generally greater than about 10 repeat units.

The oligomeric or polymeric silazanes of this invention may be amorphous or crystalline in nature. Such compositions may be liquid or solids which are cyclic, linear, or cyclolinear in nature. Preferably, the polysilazane has at least one silyl amine group, and more preferably, at least two terminal and primary silyl amine groups as part of its composition, although the presence of at least two Si—N bonds within the molecule suffices to provide the reactivity essential to the preparation of the novel compositions of the invention.

Representative examples of various polysilazanes that can be used include, but are not limited to, polymers described in U.S. Pat. No. 4,482,669 entitled "Preceramic Organosilazane Polymers" issued to Seyferth et al; U.S. Pat. No. 4,774,312 entitled "Polydisilacyclobuta-silazanes" issued to Burn: U.S. Pat. No. 4,689,252 entitled "Polysilazane Compositions which can Crosslink in the Presence of a Metal Compound Catalyzing a Hydrosilylation Reaction" issued to Laine et al; U.S. Pat. No. 4,612,383 entitled "Method of Producing Polysilazanes" issued to King et al.

Also included within the definition of "polysilazanes" or silazane polymers are the "polyureasilazanes", which includes the poly(thio)ureasilazanes, such as disclosed by U.S. Pat. No. 5,155,181 entitled "(Thio)amide-Modified Silazane Polymer Composition Containing a Free Radical Generator" by Schwark; U.S. Pat. No. 4,929,704 for "Isocyanate- and Isothiocyanate-Modified Polysilazane Ceramic Precursors" also to Schwark, and U.S. Pat. No. 5,021,533 for "Crosslinkable Poly(thio)urea-silazane Composition Containing a Free Radical Generator", also to Schwark. The entire disclosures of these U.S. Patents and the references contained therein are hereby incorporated herein by reference.

In the alternative, and preferably, novel polysilazanes may be prepared according to the methods set forth in U.S. Pat. No. 6,329,487, dated Dec. 11, 2001, the contents of which are incorporated herein-by-reference.

Briefly, the novel polysilazanes prepared are characterized by repeating units of silicon-nitrogen linkages and comprising a reduced amount of Si—H bonds relative to the quantity of Si—H bonds found in the halosilanes used to prepared the novel polysilazanes. The term halosilanes is meant to include organohalosilanes, as well inorganic species.

The preferred novel polysilazanes are prepared by reacting a halosilane, that must have at least one Si—H bond, with anhydrous liquid ammonia, where the halosilane has the general formula:

(A)

where m is 0 to 2, n is 1 to 3, provided the sum of m+n is from 1 to 3.

While the halosilanes of formula (A) are especially preferred, other representative halosilanes useful in the preparation of the coating compositions of the present invention includes those compounds represented by the structural formula:

(B)

where m is 1, 2 or 3.

In each of the above halosilanes (A and B) R may be identical or different, i.e., independently selected, and can be a substituted or unsubstituted alkyl group, a substituted or unsubstituted cycloalkyl group, a substituted or unsubstituted alkenyl group and a substituted or unsubstituted aryl group; X is a halogen atom selected from bromine, chlorine or iodine. Preferably, when m is 2, each R is the same, as those silanes are more readily available and easier to make. When R is methyl or ethyl, X is preferably chlorine, m is preferably 1 and n is preferably 1.

Representative examples of suitable halosilanes and organohalosilanes include, but are not limited to, dichlorosilane, methyldichlorosilane, dimethylchlorosilane, dimethyldichlorosilane, diethylchlorosilane, ethyl dichlorosilane, ethyl dibromosilane, ethyldiiodosilane, ethyl difluorosilane, dichloromonofluorosilane, propyldibromosilane, isopropyldichlorosilane, butyldiiodosilane, n-propyldichlorosilane, dipropylchlorosilane, trichlorosilane, n-butyldichlorosilane, isobutyldichlorosilane, isoamyldichlorosilane, benzyldichlorosilane, naphthyldichlorosilane, propenyldichlorosilane, phenyldichlorosilane, diphenylchlorosilane, methylethylchlorosilane, vinylmethylchlorosilane, phenylmethylchloro-silane, dibenzylchlorosilane, p-chlorophenylsilicon dichloride, n-hexyldichlorosilane, cyclohexyldichlorosilane, dicyclohexylchlorosilane, diisobutylchlorosilane, paratolyldichlorosilane, diparatolyl-chlorosilane, parastyryldichlorosilane, ethynyldichlorosilane, and mixtures thereof.

The preferred organohalosilanes are methyldichlorosilane and dimethyldichlorosilane, as they are commercially available and work well.

Mixtures of halosilanes are also useful in preparing the polysilazane reactant because the organic groups attached to silicon can often impart a variety of chemical and/or physical characteristics of use to the polymer. For instance, organic residues of high hydrocarbon content can assist in hydrocarbon solvent solubility, as well as confer a greater degree of hydrolytic stability to the polysilazane.

To confer some of the desirable characteristics certain organic residues can impart to the polysilazane reactant, the novel halosilanes of general formula (A) can be mixed with up to about 90 wt % of a halosilane that does not contain an Si—H bond, such as species falling within the genus of general formula (B) before the preparation of the polysilazane via ammonolysis in anhydrous liquid ammonia. Preferably, the halosilane of the above general formula (A) is mixed with the second halosilane that does not contain an Si—H bond prior to ammonolysis, for the sake of simplicity.

The novel polysilazane compounds represented by structural formula (A) in the preferred embodiment described above are prepared by ammonolysis, the method comprising the following steps:

introducing at least one halosilane having at least one Si-hydrogen bond into anhydrous liquid ammonia wherein any formed ammonium halide salt is solubilized and provides an acidic environment therein; and maintaining the formed silazanes in the acidic environment for further polymerization thereby reducing the number of Si—H bonds that were present initially in the starting halosilane.

No metal catalyst or other added catalytic agent is required to produce the preferred silazane polymers described above.

The selected halosilane or mixtures thereof are introduced directly into and reacted with anhydrous liquid ammonia. Normally, during ammonolysis, on a strictly stoichiometric basis, two molecules of ammonia are needed for each halogen atom substituted on a halosilane. One ammonia molecule replaces the halogen atom, while the second molecule of ammonia forms an ammonium halide salt. In this regard, it has been found to be advantageous to introduce the halosilanes into a closable reaction vessel which is already charged with an excess of anhydrous liquid ammonia, preferably, at least twice the amount of ammonia as Si—X bonds present. More preferably, it is desirable to use at least five times the amount of ammonia as Si—X bonds.

The anhydrous liquid ammonia is maintained at a sufficient temperature and/or pressure to remain in a liquefied state and, preferably, between about −33° C. to about 130° C. As a result, the anhydrous ammonia, in a liquefied state, acts as a reactive solvent that not only participates as a nucleophile in the nucleophilic attack on the halosilane, but also solubilizes and retains a substantial amount of ammonium halide salt produced during ammonolysis.

While not wishing to be bound by any particular theory of operation, it is believed that by retaining the solubilized and ionized ammonium halide in the liquid ammonia solution, the ionized salt acts as an effective catalyst in the polymerization process to produce novel polysilazanes which are depleted in Si—H content from their original composition without the use of added metallic or other added catalysts.

It has been observed that, initially, the reaction proceeds in a homogeneous phase wherein the generated ammonium halide salt is solubilized and ionized in the anhydrous liquid ammonia solution of silane ammonolysis product, thereby reducing precipitation of ammonium halide salt and allowing the solubilized salt to act in catalytic fashion to polymerize the halosilane ammonolysis products. This process is accompanied by a reduction in Si—H bonds in the product relative to the number present in the halosilane reactants and ammonolysis products. Once formed, the polysilazane product having reduced Si—H content is then found to spontaneously separate from the liquid ammonia phase. In this new phase layer it is essentially free from ammonium chloride salt contamination.

As such, solubilization of ammonium chloride avoids contamination of the ammonolysis products with precipitated salt. The process described above also eliminates the need for introducing an inert solvent to reduce the viscosity of the reaction mixture, as described in prior art. A distinct disadvantage of adding such inert solvent, is the problem of dealing with the large evolution of heat which accompanies the crystallization of the ammonium chloride from the reaction mixture. This problem is circumvented in the process described above, since the ammonium chloride remains in solution in the anhydrous liquid ammonia.

The mechanism for further polymerization of silazanes formed during the ammonolysis process where a reduction in the number of Si—H bonds present in the initial ammonolysis products occurs is not completely understood. Unexpectedly, further polymerization through ammonolysis can be effected without active silicon-halogen ammonolysis sites on a starting compound which has at least one Si—H bond. It is believed that heterolytic cleavage of the Si—H bond provides a route for further ammonolysis until all active Si—H sites are cleaved and reacted and/or the preferred viscosity is achieved.

The novel polysilazanes preferred for use in the present invention are characterized by having a decreased number of Si—H bonds relative to the amount of Si—H bonds contained in the starting compounds. The reduction in Si—H bonds can range from about 10% to about 90% relative to the number of Si—H bonds contained in the starting compounds. Additionally, it has been found there is a proportional increase in the Si—N linkages which is essentially proportional to the reduction in Si—H bonds. The novel polysilazanes of structural formula (A) are believed to comprise several different structures including linear, branched, ladder, and fused ring morphologies, although it is believed that these novel polysilazanes have fewer isolated ring structures than prior polysilazanes.

Representative examples of a polysilazane having fused six and eight membered rings are shown in structures (1) and (2) below. These structures are merely representative of the novel polysilazanes prepared with the halosilanes of structural formula (A) employing the novel methods disclosed in U.S. Pat. No. 6,329,487, wherein R is independently selected from the group consisting of hydrogen, substituted or unsubstituted alkyl, substituted or unsubstituted cycloalkyl, substituted or unsubstituted alkenyl or substituted or unsubstituted aryl group, and n is 1 or greater.

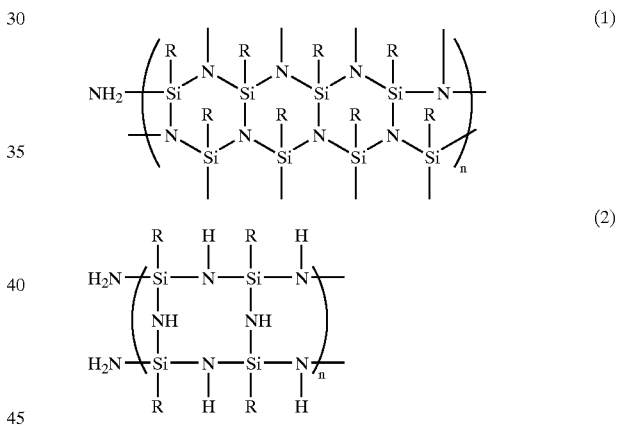

While not wishing to be bound by theory, it is believed that the initial reaction leading to the formation of these novel ammonolysis products may be represented generally by the following scheme showing a possible mechanistic route using a Si—H bond containing starting compound, such as methyldichlorosilane:

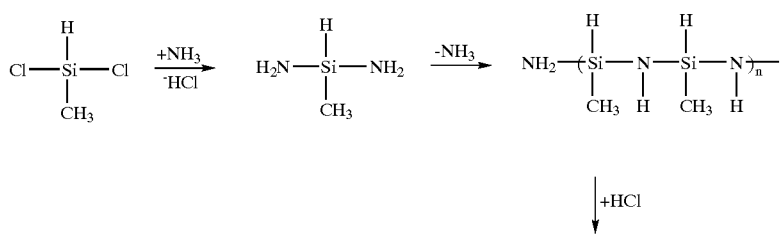

-continued

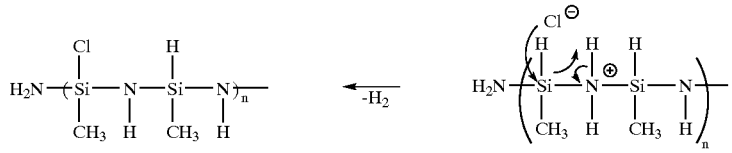

During the initial ammonolysis, the silicon-chlorine bonds undergo ammonolysis, generating a diaminosilane which is further converted into a linear molecule containing several Si—N repeat units. The linear structure is stabilized in the anhydrous liquid ammonia containing an ionized ammonium halide salt dissolved therein. This ionized and dissolved ammonium halide salt then acts as an acid catalyst which catalyzes a loss of a Si—H bond to generate a new silicon-chlorine bond on the straight chain of the polymer. The newly generated chlorosilane bond may then undergo further ammonolysis. This reaction will proceed until virtually all chlorosilicon bonds undergo ammonolysis.

The polymerization can be performed in the same reactor and at the same conditions used for ammonolysis and without isolation of the initial silazane ammonolysis product. Thus, ammonolysis and polymerization may all be occurring at the same time. Two easily-separated phases are formed and the novel polysilazane can be easily isolated in a relatively pure state by filtering and washing with either additional liquid ammonia, or a simple hydrocarbon solvent, such as hexane or heptane.

The foregoing novel polysilazanes used as starting materials in the preparation of the moisture curable coating compositions of this invention are also commercially available under the Kion™ from the Kion Corporation, Columbus, Ohio.

In addition to the polysilazane reactant (Z), any polysiloxazane or mixture of polysiloxazanes with one another, or with polysilazanes known in the art or commercially available can be used to prepare the novel alkoxy silyl substituted compositions of this invention. In addition to the definition given above, the term "polysiloxazane" is also intended to mean any oligomeric or polymeric composition comprising a plurality of Si—N repeat units, as well as a plurality of Si—O repeat units. The oligomeric and polymeric siloxazane reactants of this invention may be amorphous or crystalline in nature. Such compositions may be liquid or solid, cyclic, linear, or cyclolinear in nature. The polysiloxazanes preferably have at least one silyl amine group, and more preferably, at least two terminal and primary silyl amine groups as part of its composition, although the presence of at least two Si—N bonds within the molecule suffices to provide the reactivity essential to the preparation of the novel compositions of this invention.

Representative examples of various polysiloxazanes that can be used include, but are not limited to, polymers described in U.S. Pat. Nos. 5,405,655 and 5,919,572 to Blum et al.

In addition to the polysilazanes, polysiloxazanes and mixtures thereof discussed hereinabove for preparing the coating compositions of this invention, other silicon-containing polymers (Z) may be employed in making the alkoxy silyl substituted silicon-containing polymers. Representative examples are the novel block copolymers disclosed in copending U.S. patent application Ser. No. 09/793,224, filed Feb. 26, 2001, now U.S. Pat. No. 6,534,104 the contents of which are incorporated herein-by-reference. This application teaches the preparation of block copolymers of silazanes and siloxanes by the reaction of preformed polysilazanes with silyl hydroxy or silyl amine terminated polysiloxanes.

The polysilazane blocks described in the above copending application may be oligomeric or polymeric in nature, cyclic, linear, or cyclolinear in structure, and either liquid or solid in form. Preferably, each polysilazane contains at least four repeating units, and more preferably, from about six to greater than about 20 repeating units. The polysilazane blocks may contain at least two silyl amine groups through which they can polymerize with functional groups, such as hydroxyl groups of the polysiloxane blocks. Notwithstanding, the presence of at least one Si—N bond within the polysilazane would suffice to promote such reactivity when a reactive, nucleophilic group is used to promote the copolymerization of the polysilazane and polysiloxane blocks used in the preparation of the novel block copolymers. The reaction of an Si—OH group with an Si—NRH group (wherein R=hydrogen, alkyl, substituted alkyl, cycloalkyl, etc . . . ) results in the formation of an Si—O—Si bond scheme with the evolution of ammonia or an amine. The reaction of an Si—OH group with a Si—NR—Si group results in the formation of an Si—O—Si group and an Si—NRH group. This Si—NRH group can subsequently react with an additional Si—OH group to form an Si—O—Si group and a molecule of ammonia or amine, as described above. Thus, in a preferred embodiment of the invention, polysilazanes are reacted with —OH functional polysiloxanes to prepare block copolymers in which the blocks of polysilazane and polysiloxane are joined by Si—O—Si bond linkages.

Although the above description illustrates the reactivity of an Si—OH group with a polysilazane, a variety of other nucleophilic groups may be used to prepare the block copolymers. Thus, the polysiloxane used in the practice of the invention may comprise such nucleophilic groups as —OH, —NH$_2$, —NRH, —CO$_2$H, —SH, and others to effect the desired covalent linkages between the polysilazane blocks and the polysiloxane blocks of the novel block copolymers. While this group is representative of the types of nucleophilic moieties which can react with Si—N bonds in the polysilazanes used in the practice of the invention, it is not limiting. Indeed, any nucleophilic group which can cleave the Si—N bond can be used to prepare these novel compositions. The nucleophilic group may be bonded directly to silicon, or may be present at the terminus of a "spacer" group which is bonded to silicon. Accordingly, a polysiloxane which is terminated with an aminopropylsilyl group is also suitable for the practice of the invention:

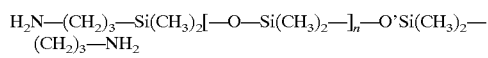

The polysilazane blocks are copolymerized with any polysiloxane or mixtures of different polysiloxanes that are commercially available, or can be prepared by methods well-known in the art. The polysiloxane may contain a linear, branched, or cross-linked polymeric system of alternating silicon and oxygen atoms having the general formulas:

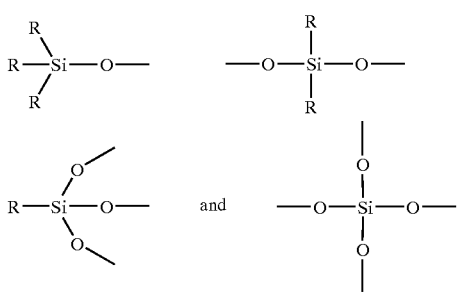

where R may be the same or different and includes, but is not limited to hydrogen, a substituted or unsubstituted alkyl group, a substituted or unsubstituted cycloalkyl group, a substituted or unsubstituted alkenyl group, and a substituted or unsubstituted aryl group and the like.

Preferably, the polysiloxane contains at least two reactive nucleophilic functional groups including hydroxyl groups, amine groups, acid groups, and thiol groups. More preferably, a polysiloxane contains hydroxyl groups. It is believed that a polysiloxane polymer having at least two, and preferably more nucleophilic substituents acting as reactive groups attack the Si—$NH_2$ or Si—NH—Si bonds of the polysilazane as described above, resulting in the breaking of these bonds and the formation of new bonds. The polysiloxane should contain at least 4 repeating units; preferably the polysiloxane contains about 6 to greater than about 20 repeating units to maximize the advantageous properties of each segment in the block copolymer.

The polysilazane/polysiloxane block copolymer can be prepared by polymerizing the polysilazane with the polysiloxane. The weight ratio of the polysilazane to the polysiloxane should be about 15:85 to about 85:15 as at ratios above or below these full copolymerization of the blocks is often not effected; the preferred polysilazane/polysiloxane weight ratio is about 20:80 to about 80:20. At least about 90 wt % of the copolymer should be made from polysilazane and polysiloxane blocks that are each at least 10 wt % of the copolymer. When —OH or —$NH_2$ functional polysiloxanes are used to prepare the novel block copolymers, no catalyst is required. Also, no solvent is required during polymerization, but a solvent can be added to reduce the viscosity, if desired.

While copolymerization can be performed in preparation of the blocks at temperatures approximating room temperature, or even below, more economically attractive rates of reaction can be achieved by heating reaction mixtures to at least 45° C., and more preferably, from about 65° C. to about 100° C. The reaction typically requires from about one to about two hours. The reaction is complete when off gassing ceases. While the block copolymer will flow freely without added solvent, the viscosity can be reduced, if desired, by the addition of an aromatic hydrocarbon solvent such as, toluene, xylene, an aliphatic hydrocarbon solvent such as heptane, decane, or dodecane, an ether solvent such as tetrahydrofuran or anisole, an ester solvent, such as hexyl acetate or butyl propionate, or a ketone solvent such as acetone, methylethylketone, and the like.

As disclosed hereinabove, the novel moisture curable polysilazanes and polysiloxazanes are prepared by reacting a preformed polysilazane or polysiloxazane with reagents having reactive amine or hydroxyl functionality. Alkoxy silyl reagents useful in the practice of this invention have the structural formula:

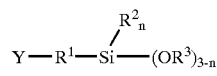

wherein Y is either OH, $OCOR^6$ or $NHR^6$, and the values for $R^1$ to $R^3$, $R^6$ and n are the same as those disclosed heretofore.

Representative alkoxy silyl reagents useful for the practice of this invention include, but are not limited to acetoxymethyltriethoxysilane, acetoxymethyltrimethoxysilane, acetoxypropyltrimethoxysilane, N-(3-acryloxy-2-hydroxypropyl)-3-aminopropyltriethoxysilane, (3-acryloxypropyl)dimethylmethoxysilane, (3-acryloxypropyl)methyldimethoxysilane, (3-acryloxypropyl)trimethoxysilane, 3-(N-allylamino) propyltrimethoxysilane, 4-aminobutyltriethoxysilane, N-(2-aminoethyl)-3-aminoisobutylmethyldimethoxysilane, (aminoethylaminomethyl)phenethyltrimethoxysilane, N-(2-aminoethyl)-3-aminopropylmethyldimethoxysilane, N-(2-aminoethyl)-3-aminopropyltrimethoxysilane, N-(6-aminohexyl)aminopropyltrimethoxysilane, 3-(m-aminophenoxy)propyltrimethoxysilane, m-aminophenyltrimethoxysilane, p-aminophenyltrimethoxysilane, 3-(3-aminopropoxy)-3,3-dimethyl-1-propenyl-trimethoxysilane, 3-aminopropyldimethylethoxysilane, 3-aminopropylmethyldiethoxysilane, 3-aminopropyl-triethoxy-silane, 3-aminopropyltrimethoxysilane, 3-aminopropyltris(methoxyethoxyethoxy)silane, benzoyloxypropyltrimethoxysilane, bis-(2-hydroxyethyl)-3-aminopropyltriethoxysilane, hydroxymethyltriethoxysilane, (methacryloxymethyl)dimethylethoxysilane, methacryloxymethyltriethoxysilane, methacryloxymethyltrimethoxysilane, methacryloxypropyl-dimethylethoxysilane, methacryloxypropyltriethoxysilane, methacryloxypropyltris(methoxyethoxy)silane, N-methylaminopropylmethyldimethoxysilane, N-methylaminopropyltrimethoxysilane, N-phenylaminopropyltrimethoxysilane, (3-trimethoxysilylpropyl) diethylenetriamine.

Acetoxymethyl-triethoxysilane, acetoxymethyltrimethoxysilane, acetoxy-propyltrimethoxysilane, N-(2-aminoethyl)-3-aminopropyltri-methoxysilane, 3-(3-aminopropoxy)-3,3-dimethyl-1-propenyl-trimethoxysilane, 3-aminopropyltriethoxysilane, 3-amino-propyl-trimethoxysilane, and (3-trimethoxysilylpropyl) diethylenetriamine are preferred.

Most preferred are member selected from the group consisting of N-(2-aminoethyl)-3-aminopropyl-trimethoxysilane, 3-aminopropyltriethoxysilane, 3-aminopropyltrimethoxysilane, and (3-trimethoxy-silylpropyl)diethylenetriamine.

Specific representative alkoxy silyl substituted polymers of the invention include the following:

$$Z-X-R^1-Si\overset{R^2_n}{\underset{}{-}}(OR^3)_{3-n}$$

| Z | X | R1 | R2 | R3 | n |
|---|---|---|---|---|---|
| polysilazane | =NH | propylene | — | C$_2$H$_5$— | 0 |
| polysilazane | =NH | propylene | — | CH$_3$— | 0 |
| polysilazane | =NCH$_3$ | propylene | — | C$_2$H$_5$— | 0 |
| polysilazane | =NCH$_3$ | propylene | — | CH$_3$— | 0 |
| polysilazane | =NH | —(CH$_2$)$_2$NH(CH$_2$)$_3$— | — | C$_2$H$_5$— | 0 |
| polysilazane | =NH | —(CH$_2$)$_2$NH(CH$_2$)$_3$— | — | CH$_3$— | 0 | wherein Z contains only hydrogen and methyl groups bonded to silicon.

The novel alkoxy silyl substituted polysilazanes and polysiloxazanes of the present invention are prepared by simply heating the desired polysilazane or polysiloxane or mixtures of polysilazanes and polysiloxazanes in the presence of the alkoxy silyl reagent. An amount of alkoxy silyl reagent is chosen such that the final composition contains a ratio wherein the total number of OR$^3$ groups of A to Si—N bonds in Z is generally from about 0.05 to about 2.5, preferably from about 0.1 to about 1.0, and most preferably from about 0.1 to about 0.50.

The reaction is typically performed without solvent, since the preferred alkoxy silyl reagents, polysilazanes, and polysiloxazanes are typically liquids. However, the reaction may optionally be performed in solvent. Suitable solvents include hydrocarbon solvents such as toluene, hexane, or heptane, ether solvents such as tetrahydrofuran or dimethoxyethane, or dry ketone solvents such as acetone, methyl ethyl ketone, and the like.

The reaction is generally conducted in a range from about 25° to about 150° C., and more specifically, from about 50° and 120° C., and most preferably, from about 80° to about 110° C. Times for the reactions to go to completion generally range from about 10 minutes to about 2 hours.

When solvent is omitted, the reaction product may be used directly upon cooling with no further work-up. When a solvent is employed, the solvent may be removed by conventional techniques, such as distillation. Alternatively, the solution of the reaction product in the solvent may be used directly to coat a substrate.

Coated substrates according to this invention are prepared by coating the alkoxy silyl substituted polysilazane or polysiloxazane composition directly onto the substrate of interest, provided the polymer is a low viscosity liquid. When the polymer is a solid or a high viscosity liquid, the alkoxy silyl substituted polysilazane or polysiloxazane can be dissolved in a compatible organic solvent to prepare a coating solution.

Preferred solvents for preparing the coating solutions are such that they do not react with the polymer (e.g., alcohol or amine solvents should generally be avoided when preparing coatings of polysilazanes and polysiloxazanes when solvent reactivity is desired), and are sufficiently volatile to facilitate drying the coatings. Also, it is desirable to avoid use of hazardous solvents, such as benzene, trichloroethylene, and the like. Examples of particularly preferred solvents include toluene, tetrahydrofuran and hexane. Generally, coating solutions are formulated with from 0.1 wt % to 99 wt % polymer, and more specifically from 0.1 wt % to about 20 wt % polymer, and most preferably from 0.1 wt % to about 10 wt % polymer.

It may also be desirable to incorporate organic or inorganic powders into the coating compositions. This may be done for a number of reasons, the most obvious of which are to increase the viscosity of the coating solutions to enable preparation of a paste, or a relatively thick solution so that it may be "painted" onto a substrate, or to impart specific performance characteristics to the coating. For example, metal powders, such as copper, iron, zirconium, titanium, tungsten, molybdenum, zinc, and aluminum may be admixed with the polymeric solution prior to coating. Such a technique is useful, for example, to provide an anti-corrosion barrier on the surface of a metallic substrate. Incorporation of metal powder into the coating solution is also useful to prepare a harder coating, regardless of the substrate (in which case preferred metal powders include zirconium, titanium, tungsten, molybdenum and hafnium powders).

It may also be desirable to incorporate ceramic powders and glasses, such as silicon carbide, silicon nitride, boron carbide, titanium carbide, titanium nitride, tungsten carbide, molybdenum oxide, silica and aluminum oxide, typically for the purpose of creating a harder coating, but also useful for providing a nonconductive surface on a conductive substrate, for providing corrosion-resistant coatings, impact-resistant coatings, and coatings having a mismatched thermal expansion coefficient, i.e., relative to the substrate surface. Inclusion of silica, boron nitride, aluminum nitride or beryllium oxide powders in the coating solution is desirable in electronics applications, insofar as these materials are good dielectrics. Carbon powder (including pyrolytic carbon powder and graphite powder) and organic powders such as Teflon®, polysiloxane, poly-carbonate, or polyamide powders may also be used to thicken the coating solutions. In addition, various mineral powders may be employed, such as clays, which can act as thixotropes.

The invention contemplates coating a wide variety of substrates employing the polymeric compositions and methods disclosed herein. They include substrates comprised of metallic, ceramic, glass and organic materials, such as polyesters, nylons, acrylates, and so on. Specific representative examples of metal substrates include steel, aluminum, copper and alloys thereof. Examples of ceramics include silicon nitride, silicon carbide, silica, alumina, zirconia, and the like. It will be appreciated by those skilled in the art that the foregoing lists are merely illustrative of various materials which may be coated using the presently disclosed compositions and methods, and are not in any way limiting of the different substrates with which the present invention is useful.

It will also be understood, the present methods are also useful in coating substrates having different shapes, e.g., substrates having flat, planar surfaces, molded articles having curved surfaces, fibers, fabrics, and the like.

Coatings may be applied by dipping the substrate in the aforementioned coating compositions. Alternatively, the coatings may be applied by painting, wiping, spraying or spin-coating techniques. These procedures will typically provide pure polymer coatings having thicknesses of up to about 75 microns per coat for the cured polymers, but may provide coatings on the order of 1 micron or even thinner, if desired. If a thicker coating is desired, multiple coating layers may be provided. The layers may be comprised of the same or different polymeric materials, and may be applied from coating compositions which may or may not contain solvent.

Coatings may be cured at temperatures ranging from room temperature to about 50° C. Preferably, curing is performed at temperatures not exceeding about 100° C.

Coatings prepared by methods of the invention are cured in an atmosphere which promotes crosslinking of the polymer by its reaction with moisture. These curing atmospheres include, but are not limited to, air and other non-reactive or reactive gaseous environments which contain moisture, inert gases like nitrogen and argon, and reactive gases such as ammonia, hydrogen, carbon monoxide, and so on. Rapid cure times are achieved using this method when the applied coatings are exposed to the moisture-containing atmosphere at room temperature.

The coatings so provided may be used in a wide variety of contexts, insofar as they protect virtually any type of substrate from oxidative thermal degradation, corrosion, or chemical attack. The coatings may also be used to strengthen relatively flaw sensitive brittle substrates such as glass and, as noted earlier herein, can be useful for providing a nonwetting surface. The coatings may additionally be useful to provide electrical insulation and/or bonding or compatibility interfaces between different types of materials.

The following best mode examples are provided to enable those of ordinary skill in the art with a complete disclosure and description of how to carry out the methods of the invention and make the thermally stable, corrosion-resistant coatings claimed herein, and are not intended to limit the scope of what the inventors regard as their invention. Unless indicated otherwise, parts are parts by weight, temperature is in degrees centigrade, and pressures are at or near atmospheric.

EXAMPLE 1

Part A

A preferred silazane copolymer reactant was first prepared according to Example 1 of U.S. Pat. No. 6,329,487 by coammonolysis of a mixture of 673.5 grams of methyldichlorosilane and 346.9 grams of dimethyldichlorosilane.

Part B

A moisture curable silyl alkoxy-substituted polysilazane was prepared having a silyl ethoxy group, $\equiv$Si—OCH$_2$CH$_3$, to Si—N bond ratio of 0.42, according to the following steps:

10.53 Kg of the silazane copolymer prepared according to Part A above and 5.19 kg of 3-aminopropyltriethoxysilane were blended together at room temperature for a period of 1 hour and then allowed to stand without stirring for 12 hours. The blend was then slowly heated to 78° C. with constant stirring under a nitrogen atmosphere. Pronounced gas evolution was observed when the heating temperature reached 55° C. Gas evolution continued until the temperature reached 70° C. The reaction mixture was held at 78° C. for a period of 2 hours, and then slowly allowed to cool to room temperature with constant stirring.

The resulting product was a clear, colorless liquid having a viscosity of 21.5 cp, measured using a Wells-Brookfield Cone/Plate Digital Viscometer.

FT-IR spectra were obtained using a Nicolet Magna-IR Spectrometer 550 with an ATR adapter. Wave numbers are presented as cm$^{-1}$ where (w)=weak; (m)=medium and (s)= strong absorbencies RT-IR Analysis indicated characteristic peaks at the following wave numbers: 3385(w), 2958(w), 2927(w), 2896(w), 2120(m), 1442(w), 1390(w), 1253(m), 1166(m), 1104(m), 1074(m), 940(s), 896(s), 831(m), 781(m).

EXAMPLE 2

The following experiment was performed to demonstrate the preparation of a moisture curable, silyl alkoxy-substituted polysilazane having a silyl ethoxy group, $\equiv$Si—OCH$_2$CH$_3$, to Si—N bond ratio of 0.12, according to the following protocol:

162.3 grams of 3-aminopropyltriethoxysilane were added at room temperature with constant stirring to 1190.2 grams of the silazane copolymer prepared according to Example 1, Part A. The reaction mixture was then slowly heated to 78° C. with constant stirring under a nitrogen atmosphere. The reaction was held at this temperature for 1.5 hours, after which heating was stopped and the reaction mixture was allowed to cool slowly to room temperature with stirring under nitrogen.

The resulting product was a clear, colorless liquid having a viscosity of 24.8 cp. FT-IR analysis indicated characteristic peaks at the following wave numbers: 3377(w), 2957(w), 2897(w), 2119(m), 1391(w), 1253(m), 1167(m), 1105(w), 1079(w), 935(s), 893(s), 831(m), 783(s).

EXAMPLE 3

A moisture curable, silyl alkoxy-substituted polysilazane having a silyl ethoxy group, $\equiv$Si—OCH$_2$CH$_3$, to Si—N bond ratio of 0.12 was prepared by a 2-step heating schedule by the following method:

290.7 grams of 3-aminopropyltriethoxysilane were added at room temperature with constant stirring to 2131.8 grams of the silazane copolymer prepared according to Example 1, Part A. The reaction mixture was then slowly heated to 50° C. with constant stirring under a nitrogen atmosphere. The reaction was allowed to proceed at this temperature for 1.5 hours, after which heating was stopped and the reaction mixture was allowed to cool slowly to room temperature. The reaction mixture was then slowly heated to 78° C. with constant stirring under a nitrogen atmosphere. The reaction was held at 78° C. for 1 hour, and then allowed to cool slowly to room temperature with stirring under nitrogen.

The resulting product was a clear, colorless liquid having a viscosity of 32.7 cp. FT-IR analysis indicated characteristic peaks at the following wave numbers: 3385(w),2956(w), 2898(w), 2118(m), 1391(w), 1253(m),1167(m), 1105(w), 1079(w), 935(s), 893(s), 831(m), 783(m).

EXAMPLES 4–6

Further experiments were performed to demonstrate the preparation of moisture curable, silyl alkoxy-substituted polysilazanes having silyl ethoxy group, $\equiv$Si—OCH$_2$CH$_3$, to Si—N bond ratios of 0.37, 0.29, and 0.22.

Three separate mixtures of 3-aminopropyltrimethoxysilane and the silazane copolymer prepared according to Example 1, Part A, above were prepared by blending the two reagents at room temperature in the following ratios:

a) 202.10 grams of the silazane copolymer with 86.61 grams of 3-aminopropyltriethoxysilane [$\equiv$Si—OCH$_2$CH$_3$ group to Si—N bond ratio of 0.37];

b) 175.90 grams of the silazane copolymer with 58.70 grams of 3-aminopropyltriethoxysilane [$\equiv$Si—OCH$_2$CH$_3$ group to Si—N bond ratio of 0.29], and c) 175.00 grams of the silazane copolymer with 45.10 grams of 3-aminopropyltriethoxysilane [$\equiv$Si—OCH$_2$CH$_3$ group to Si—N bond ratio of 0.22]

Each reaction mixture was heated slowly to 120° C. with constant stirring under a nitrogen atmosphere. Upon reaching 120° C., heating was stopped and the reaction mixtures were allowed to cool slowly to room temperature with constant stirring under a nitrogen atmosphere.

Product (a) was a clear, colorless liquid having a viscosity of 18.9 cp. FT-IR analysis indicated characteristic peaks at the following wave numbers: 3379(w), 2958(w), 2927(w), 2895(w), 2120(m), 1442(w), 1391(w), 1253(m), 1167(m), 1104(m), 1079(m), 940(s), 896(s), 831(m), 784(m).

Product (b) was a clear, colorless liquid having a viscosity of 21.5 cp. FT-IR analysis indicated characteristic peaks at the following wave numbers: 3384(w), 2957(w), 2897(w), 2120(m), 1442(w), 1391(w), 1253(m), 1167(m), 1104(m), 1078(w) 940(s), 895(s), 831(m), 783(m).

Product (c) was a clear, colorless liquid having a viscosity of 25.1 cp. FT-IR analysis indicated characteristic peaks at the following wave numbers: 3379(w),2957(w), 2898(w), 2120(m), 1391(w), 1253(m), 1167(m), 1104(w), 1078(w), 940(s), 894(s), 830(m), 783(m).

EXAMPLE 7

A moisture curable, silyl alkoxy-substituted polysilazane was prepared with a silyl ethoxy group, $\equiv$Si—OCH$_2$CH$_3$, to Si—N bond ratio of 0.21 according to the following steps:

258.95 grams of 3-aminopropyltriethoxysilane was added gradually to 1035.80 grams of the silazane copolymer prepared according to Example 1, Part A, above with constant stirring at room temperature. The reaction mixture was then heated gradually to a temperature of 125° C. with constant stirring under a nitrogen atmosphere. Gas evolution was observed during heating to 125° C. Upon reaching 125° C., heating was stopped and the reaction mixture was allowed to cool to room temperature with constant stirring under a nitrogen atmosphere and stirred overnight at room temperature.

Another 258.95 grams of 3-aminopropyltriethoxysilane was then added in a single portion to the reaction mixture at room temperature with stirring under nitrogen. The reaction mixture was then heated again gradually to 125° C. After gas evolution subsided, heat was removed and the reaction mixture was allowed to cool to room temperature with constant stirring under nitrogen.

The resulting product was a clear, colorless liquid with a viscosity of 16.9 cp. FT-IR analysis indicated characteristic peaks at the following wave numbers: 3379(w), 2956(w), 2927(w), 2895(w), 2120(m), 1442(m), 1390(w), 1253(m), 1167(m), 1104(m), 1078(m), 936(s), 896(s), 831(m), 784(m).

EXAMPLE 8

A further experiment was performed to demonstrate the preparation of a moisture curable, silyl alkoxy-substituted polysilazane having a silyl methoxy group, $\equiv$Si—OCH$_3$, to Si—N bond ratio of 0.35, according to the following steps:

100.0 grams of the silazane copolymer prepared according to Example 1, Part A, above and 49.3 grams of the N-(2-aminoethyl)-3-aminopropyltrimethoxysilane were blended together at room temperature. The reaction mixture was then heated gradually to 50° C. with constant stirring under a nitrogen atmosphere and held at this temperature for 1 hour. The reaction temperature was then raised to 75° C., and held at that temperature for an additional hour. Heating was then stopped and the reaction mixture was allowed to cool slowly to room temperature with stirring under a nitrogen atmosphere.

The product was a clear, colorless liquid having a viscosity of 30.7 cp. FT-IR analysis indicated characteristic peaks at the following wave numbers: 3377(w), 2954(w), 2838(w), 2118(m), 1457(w), 1408(w), 1252(m), 1172(m), 1085(m), 936(s), 895(s), 827(m), 783(m).

EXAMPLE 9

A moisture curable, silyl alkoxy-substituted polysilazane was prepared having a silyl methoxy group, $\equiv$Si—OCH$_3$, to Si—N bond ratio of 0.35, according to the following steps:

100.0 grams of a silazane copolymer prepared according to Example 1, Part A, above, and 49.3 grams of N-(2-aminoethyl)-3-aminopropyltrimethoxysilane were blended together at room temperature to form a reaction mixture. The reaction mixture was then heated gradually to 110° C. with constant stirring under a nitrogen atmosphere. Gas evolution during heating was initially quite pronounced, but quickly subsided. After 2 hours of stirring at 110° C., heating was stopped and the reaction mixture was allowed to cool to room temperature with constant stirring under a nitrogen atmosphere.

The product was a clear, colorless liquid having a viscosity of <10,000 cp. FT-IR analysis indicated characteristic peaks at the following wave numbers: 3378(w), 2954(w), 2833(w), 2123(m), 1460(w), 1407(w), 1367(w), 1342(w), 1254(m), 1183(m), 1085(m), 940(s), 900(s) , 834(m) , 778(m).

EXAMPLE 10

A moisture curable, silyl alkoxy-substituted polysilazane was prepared using a mixture of 3-aminopropyltriethoxysilane and N-(2-aminoethyl)-3-aminopropyltrimethoxysilane reagents wherein the product had a combined silyl ethoxy group, $\equiv$Si—OCH$_2$CH$_3$, and silyl methoxy group, $\equiv$Si—OCH$_3$, to Si—N bond ratio of 0.38. The polymer was prepared as follows:

100.0 grams of the silazane copolymer prepared according to Example 1, Part A above, 29.9 grams of 3-aminopropyltriethoxysilane, and 19.4 grams of N-(2-aminoethyl)-3-aminopropyltrimethoxysilane were blended together at room temperature, and then gradually heated to 50° C. with constant stirring under a nitrogen atmosphere. The reaction was allowed to proceed at 50° C. for a period of 2 hours, after which the reaction temperature was raised to 75° C. The reaction was allowed to proceed at 75° C. for an additional 2 hour period, after which the temperature was again raised to 100° C. After 10 minutes at 100° C., heating was stopped and the product was allowed to cool slowly to room temperature with constant stirring under a nitrogen atmosphere.

The product formed was a clear, colorless liquid with a viscosity of 21.5 cp. FT-IR analysis indicated characteristic peaks at the following wave numbers: 3378(w), 2956(w), 2898(w), 2837(w), 2119(m), 1443(w), 1391(w), 1253(m), 1167(m), 1103(m), 1080(m), 940(s), 895(s), 830(m), 782(m).

EXAMPLE 11

An experiment was conducted to demonstrate the preparation of a moisture curable, silyl alkoxy-substituted polysilazane having a silyl ethoxy group, $\equiv$Si—OCH$_2$CH$_3$, to Si—N bond ratio of 0.34, at a reaction temperature of 125° C. using acetoxypropyltrimethoxysilane reagent.

10.0 grams of acetoxypropyltrimethoxysilane were blended with 20.0 grams of the silazane copolymer prepared according to Example 1, Part A above. 10 drops of glacial acetic acid were added to the reaction mixture to promote reaction at the ester linkage. The reaction mixture was then heated to 120° C. with constant stirring under a nitrogen atmosphere. The reaction was allowed to proceed at 120° C. for 2 hours, after which heating was stopped and the mixture allowed to slowly cool to room temperature with stirring under nitrogen.

The product formed was a clear, colorless liquid with a viscosity of 26.6 cp. FT-IR analysis indicated characteristic peaks at the following wave numbers: 3365(w), 2955(w), 2900(w), 2841(w), 2120(m), 1736(m), 1466(w), 1413(w), 1387(w), 1366(w), 1252(m), 1171(m), 1087(m), 940(s), 895(s), 823(m), 781(w).

EXAMPLE 12

A moisture curable, silyl alkoxy-and fluorocarbon-substituted polysilazane having a silyl ethoxy group, ≡Si—OCH$_2$CH$_3$, to Si—N bond ratio of 0.51, was prepared according to the following steps:

A silazane terpolymer was first prepared by coammonolysis of 100 grams of (tridecafluoro-1,1,2,2-tetrahydrooctyl) methyldichlorosilane, 152.7 grams of dimethyldichlorosilane, and 515.4 grams of methyldichlorosilane according to procedures outlined in Example 1 of U.S Pat. No. 6,329,487. The reaction provided 331.2 grams of a clear, colorless silazane terpolymer having a viscosity of 35.3 cp.

203.3 grams of this terpolymer was then blended with 100 grams of 3-aminopropyltriethoxysilane at room temperature and heated in stepwise fashion to temperatures of 50° C., 65° C., and 75° C. with constant stirring under a nitrogen atmosphere. When the temperature reached 75° C., the reaction mixture was stirred for a period of 1 hour, after which heating was terminated. The reaction product was then allowed to cool slowly to room temperature with constant stirring under nitrogen.

The product formed was a clear, colorless liquid with a viscosity of 20 cp.FT-IR analysis indicated characteristic peaks at the following wave numbers: 3383(w), 2972(w), 2928(w), 2897(w), 2124(m), 1442(w), 1391(w), 1365(w), 1253(m), 1166(m), 1104(m), 1079(m), 941(s), 897(s), 831 (m), 780(m), 707 (m)

EXAMPLE 13

Part A

As an alternative, the moisture curable polymers of the invention may be prepared from block copolymers. A preferred class of block copolymers are the polysilazane/polysiloxane type disclosed in copending U.S. patent application Ser. No. 09/793,224, filed Feb. 26, 2001 now U.S. Pat. No. 6,534,184. A hydroxy-terminated polydimethylsiloxane was prepared according to Example 5 of the above copending application by coammonolysis of a mixture of methyldichlorosilane and dimethyldichlorosilane followed by reaction with a hydroxy-terminated polydimethylsiloxane.

Part B

A moisture curable silyl alkoxy-substituted polysiloxane block copolymer having a silyl ethoxy group, ≡Si—OCH$_2$CH$_3$, to Si—N bond ratio of 0.46 was prepared according to the following steps:

61.57 grams of 3-aminopropyltriethoxysilane were added at room temperature with constant stirring to 186.57 grams of the polysiloxane block copolymer prepared according to Part A of this Example. The reaction mixture was then slowly heated to 120° C. with constant stirring under a nitrogen atmosphere. The reaction was held at this temperature for 1 hour, after which heating was stopped and the reaction mixture was allowed to cool slowly to room temperature with stirring under nitrogen.

The resulting product was a clear, colorless liquid having a viscosity of 16.4 cp. FT-IR analysis indicated characteristic peaks at the following wave numbers: 3386(w), 2060(w), 2928(w), 2897(w), 2115(w), 1442(w), 1391(w), 1256(m), 1167(m), 1102(s), 1079(s), 1018(m), 927(s), 905(s), 793(s).

EXAMPLE 14

Part A

Preparation of a preferred polyureasilazane used as a reactant in the practice of this invention was carried out by coammonolysis of a mixture of methyldichlorosilane and vinylmethyldichlorosilane followed by reaction with phenylisocyanate as taught in Example 1 of U.S. Pat. No. 4,929,704 to Schwark.

Part B

Preparation of a moisture curable, silyl alkoxy-substituted polyureasilazane having a silyl ethoxy group, ≡Si—OCH$_2$CH$_3$, to Si—N bond ratio of 0.42.

108.40 g of the polyureasilazane prepared according to Part A above and 53.39 g of 3-aminopropyltriethoxysilane were mixed and slowly heated to 78° C. with constant stirring and under a nitrogen atmosphere. Pronounced gas evolution was observed when the heating temperature reached 55° C. Gas evolution continued until the temperature reached 70° C. The reaction mixture was held at 78° C. for a period of 2 hours, and then slowly allowed to cool to room temperature with constant stirring.

The resulting product was a clear, pale yellow liquid having a viscosity of 32 cp. FT-IR analysis identified characteristic peaks at the following wave numbers (cm$^{-1}$) 3386(w), 3047(w), 2972(w), 2927(w), 2895(w), 2124(m), 1442(w), 1391(w), 1253(m), 1166(m), 1103(m), 1079(m), 945(s), 897(s), 786(m).

The following series represents comparative studies performed using the moisture-curable silyl alkoxy-substituted clear coat resins of the instant invention:

EXAMPLE 15–17

Part A

The silazane copolymer prepared in Example 1, Part A (without added solvent) was brush coated onto a steel panel which had been degreased by wiping with acetone, and further prepared by wiping with a 5% aqueous ammonium hydroxide solution.

The coating failed to cure when allowed to remain for several days on the panel at room temperature conditions.

Part B

The moisture-curable, silyl alkoxy-substituted polysilazanes prepared in Examples 1, 4, 5, and 6 containing silyl ethoxy group, ≡Si—OCH$_2$CH$_3$, to Si—N bond ratios of 0.42, 0.37, 0.29, and 0.22, respectively, were (without added solvent) brush coated also onto steel panels which had been degreased by wiping with acetone, and further prepared by wiping with a 5% aqueous ammonium hydroxide solution. The coating prepared using the polymer having a silyl ethoxy group to Si—N bond ratio of 0.42 was dry to the touch in 1 hour. The coating prepared using the polymer having a silyl ethoxy group to Si—N bond ratio of 0.37 was dry to the touch in 2 hours, and the coatings prepared using the polymers having silyl ethoxy group to Si—N ratios of 0.29 and 0.22 were dry to the touch after several hours time. All formed clear, colorless, hard coatings after being left to cure for at least 24 hours. Surface energy analysis of the cured coating indicated a contact angle with water of 98.60, and a surface energy of 17.8 dynes/cm.

EXAMPLES 18–19

The moisture-curable, silyl alkoxy-substituted polysilazanes prepared according to Examples 8 and 9 hereinabove, both containing a silyl methoxy group, ≡Si—OCH$_3$, to Si—N bond ratio of 0.35, but prepared at different temperatures, were (without added solvent) brush coated onto aluminum panels which had been degreased by wiping with acetone. Both coatings fully cured overnight to clear, colorless, hard coatings.

EXAMPLE 20

Part A

The polysilazane/polysiloxane block copolymer prepared in Example 13, Part A was (without added solvent) brush coated onto an aluminum panel substrate which had been degreased by wiping with acetone. The coating failed to cure after remaining on the substrate at ambient room conditions for several days.

Part B

The moisture-curable, silyl alkoxy-substituted polysiloxane block copolymer prepared in Example 13, Part B was (without added solvent) coated onto a aluminum panel which had been degreased by wiping with acetone. The coating fully cured overnight to a clear, smooth coating. Surface energy analysis of the cured coating indicated a contact angle with water of 98.6° and a surface energy of 15.4 dynes/cm.

EXAMPLE 21

Part A

The polyureasilazane prepared in Example 14, Part A was (without added solvent) brush coated onto an aluminum substrate which had been degreased by wiping with acetone. The coating failed to cure when allowed to remain for several days at ambient room conditions.

Part B

The moisture-curable, silyl alkoxy-substituted polyureasilazane prepared in Example 14 was (without added solvent) coated onto a aluminum panel which had been degreased by wiping with acetone. The coating fully cured overnight to a clear, smooth coating.

EXAMPLE 22

The following silver gray pigmented coating composition having exceptionally high temperature durability was prepared using the moisture curable, silyl alkoxy-substituted polysilazane of Example 1, Part B.

A one package, high temperature coating was prepared by mixing the following ingredients in the proportions indicated:

| Alkoxysilazane Reaction | weight percent |
| --- | --- |
| Product of Example 1, Part B | 18.1 |
| Aromatic 100 ® Solvent* | 6.3 |
| Aluminum Powder | 18.1 |
| Boron Carbide Powder | 2.6 |
| Zirconium Oxide Powder | 43.9 |
| Mineral Spirits | 11.0 |
| | 100.0% |

*Available from Exxon Mobil Corp.

The coating formulation was then brush coated onto a steel panel which had been degreased by wiping with acetone. After the coating was allowed to moisture-cure at room temperature for 12 hours, the coated steel panel was heated in an air atmosphere to 500° C. for 3 hours. No thermal or oxidative degradation of the coating was observed.

The coating was then tested according to ASTM test methods for salt fog and condensing humidity. The coating had the following performance characteristics:

| Test | Substrate | Exposure (Hours) | Coating Protection Field | Scribe |
| --- | --- | --- | --- | --- |
| ASTM B117 Salt Fog | S.B. Steel Sa 2½ | 600 | 6 mm red rust spots/ bleeding | Slight rusting 1–2 mm creeping |
| ASTM D2247 QCT Condensing Humidity | S.B. Steel Sa 2½ | 600 | NO EFFECT | |

The above test results indicate improved protection from corrosion for the coated samples than what would be expected from uncoated steel surfaces.

EXAMPLE 23

A two package, inorganic zinc primer was prepared by mixing the following ingredients in the proportions indicated:

| Alkoxysilazane Reaction Product | Weight Percent |
| --- | --- |
| Package A: | |
| of Example 1, Part B | 7.7 |
| Mineral Spirits | 8.4 |
| Package B: | |
| Zinc Powder (6.7 micron diameter) | 78.4 |
| Talc 3300 | 5.5 |
| | 100.0% |

Prior to coating, the two fractions were combined in equal proportions and well mixed by mechanical stirring. The fully formulated primer was then brush-coated onto a steel coupon and allowed to moisture-cure by setting on the lab bench overnight at room temperature and ambient humidity. The coating was dry to the touch in 1 hour and fully cured by the next day.

The fully cured coating had the following performance characteristics as determined by ASTM test methods

| Test | Substrate | Exposure (Hours) | Coating Protection Field | Scribe |
| --- | --- | --- | --- | --- |
| ASTM B117 Salt Fog | S.B. Steel Sa 2½ | 600 | White Ppt. no blistering or red rust | White Ppt. no blister. or red rust |
| ASTM D2247 QCT Condensing Humidity | S.B. Steel Sa 2½ | 600 | NO EFFECT | |

The above test results indicate improved protection from corrosion for the coated samples than what would be expected from uncoated steel surfaces.

We claim:

1. An alkoxy silyl substituted silicon polymer of the formula:

$$Z-A$$

wherein Z is a Si—N containing polymer in which the nitrogen atom is bonded to at least two silicon atoms, with the proviso that when the Si—N containing polymer is a silazane polymer, said polymer comprises at least one Si—H bond, A is an alkoxy silyl group of the formula:

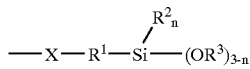

wherein
X is bonded to a silicon atom of Z; X is either O or =NR$^4$ where R$^4$ is a member selected from the group consisting of hydrogen, lower alkyl, lower alkenyl, aryl, lower alkoxy, silyl, siloxyl and silazanyl;
R$^1$ is alkylene or alkylene substituted with a heteroatom;
R$^2$ is a member selected from the group consisting of
(i) hydrogen,
(ii) hydroxyl,
(iii) C1 to C10 alkyl, either unsubstituted or substituted with hydroxyl, lower alkoxy, lower alkenyl, silyl and —N(R$^5$)$_2$ where R$^5$ is independently selected from the group consisting of hydrogen, lower alkyl and lower alkenyl,
(iv) C1 to C10 alkenyl, either unsubstituted or substituted with hydroxyl, lower alkoxy, silyl and —N(R$^5$)$_2$, and
(v) aryl of 1 or 2 rings, unsubstituted or substituted with hydroxyl, lower alkyl, lower alkenyl, lower alkoxy, silyl and —N(R$^5$)$_2$,
R$^3$ is the same as (iii), (iv) or (v);
n=0, 1 or 2, and wherein the ratio of the total number of OR$^3$ groups of A to Si—N bonds of Z is from about 0.05 to about 2.5.

2. The alkoxy silyl substituted silicon polymer of claim 1 wherein the Si—N containing polymer, Z, is a member selected from the group consisting of a silazane-containing polymer, siloxazane-containing polymer, a ureasilazane-containing polymer, a(thio) ureasilazane-containing polymer and a mixture of said polymers.

3. The alkoxy silyl substituted silicon polymer of claim 1 wherein Z is a polysilazane.

4. The alkoxy silyl substituted silicon polymer of claim 1 wherein Z is a polysiloxazane.

5. The alkoxy silyl substituted silicon polymer of claim 1 wherein Z is a polyureasilazane.

6. The alkoxy silyl substituted silicon polymer of claim 1 wherein Z is a poly(thio)ureasilazane.

7. The alkoxy silyl substituted silicon polymer of claim 3 wherein said polysilazane is characterized by repeating units of silicon-nitrogen linkages and comprises a reduced amount of silicon-hydrogen bonds relative to the quantity of silicon-hydrogen bonds in a halosilane compound used to prepare said polysilazane.

8. The alkoxy silyl substituted silicon polymer of claim 3 wherein said polysilazane comprises a reduced amount of Si—H bonds relative to the quantity of Si—H bonds incorporated into the polysilazane from a starting compound comprising at least one Si—H bond and at least one Si-halide bond, said polysilazane further comprising a greater number of Si—N bonds and a greater nitrogen content than would otherwise be derived from complete ammonolysis of the Si-halide bonds of said starting compound.

9. The alkoxy silyl substituted silicon polymer of claim 1 wherein Z is a block copolymer of a polysilazane and a polysiloxane.

10. The alkoxy silyl substituted silicon polymer of claim 1 wherein the ratio of the total number of OR$^3$ groups of A to Si—N bonds of Z is from about 0.1 to about 1.0.

11. The alkoxy silyl substituted silicon polymer of claim 1 wherein the ratio of the total number of OR$^3$ groups of A to Si—N bonds of Z is from about 0.1 to about 0.50.

12. The alkoxy silyl substituted silicon polymer of claim 1 wherein Z is a polysilazane, X is =NH, R$^1$ is propylene, R$^3$ is ethyl and n=0.

13. The alkoxy silyl substituted silicon polymer of claim 1 wherein Z is a polysilazane, X is =NH, R$^1$ is propylene, R$^3$ is methyl and n=0.

14. The alkoxy silyl substituted silicon polymer of claim 1 wherein Z is a polysilazane, X is =NCH$_3$, R$^1$ is propylene, R$^3$ is ethyl and n=0.

15. The alkoxy silyl substituted silicon polymer of claim 1 wherein Z is a polysilazane, X is =NCH$_3$, R$^1$ is propylene, R$^3$ is methyl and n=0.

16. The alkoxy silyl substituted silicon polymer of claim 1 wherein Z is a polysilazane, X is =NH, R$^1$ is —(CH$_2$)$_2$NH(CH$_2$)$_3$—, R$^3$ is ethyl and n=0.

17. The alkoxy silyl substituted silicon polymer of claim 1 wherein Z is a polysilazane, X is =NH, R$^1$ is —(CH$_2$)$_2$NH(CH$_2$)$_3$—, R$^3$ is methyl and n=0.

18. The alkoxy silyl substituted silicon polymer of claim 1 wherein Z is a polysilazane, X is =NCH$_3$, R$^1$ is —(CH$_2$)$_2$NH(CH$_2$)$_3$—, R$^3$ is ethyl and n=0.

19. The alkoxy silyl substituted silicon polymer of claim 1 wherein Z is a polysilazane, X is =NCH$_3$, R$^1$ is —(CH$_2$)$_2$NH(CH$_2$)$_3$—, R$^3$ is methyl and n=0.

20. A coating composition comprising the alkoxy silyl substituted silicon polymer of claim 1.

21. A coating composition comprising the alkoxy silyl substituted silicon polymer of claim 2.

22. A coating composition comprising the alkoxy silyl substituted silicon polymer of claim 3.

23. A coating composition comprising the alkoxy silyl substituted silicon polymer of claim 4.

24. A coating composition comprising the alkoxy silyl substituted silicon polymer of claim 5.

25. A coating composition comprising the alkoxy silyl substituted silicon polymer of claim 6.

26. A coating composition comprising the alkoxy silyl substituted silicon polymer of claim 7.

27. A coating-composition comprising the alkoxy silyl substituted silicon polymer of claim 8.

28. A coating composition comprising the alkoxy silyl substituted silicon polymer of claim 9.

29. A coating composition comprising a compatible organic or inorganic liquid and from about 0.1 to 99 wt % of the alkoxy silyl substituted silicon polymer of claim 1.

30. A coating composition according to claim 20 comprising a compatible organic or inorganic liquid and from about 1 to 20 wt % of the alkoxy silyl substituted silicon polymer.

31. A coating composition according to claim 20 further comprising a filler.

32. A coating composition according to claim 31 wherein said filler is a material selected from the group consisting of a mineral, ceramic, glass, metal and mixtures thereof.

33. A method of making an alkoxy silyl substituted silicon polymer of the formula:

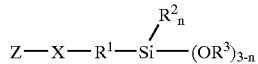

wherein Z is a Si—N containing polymer in which the nitrogen atom is bonded to at least two silicon atoms, with the proviso that when the Si—N containing polymer is a silazane polymer, said polymer comprises at least one Si—H bond, X is either O or =NR$^4$ where R$^4$ is a member selected from the group consisting of hydrogen, lower alkyl, lower alkenyl, aryl, lower alkoxy, silyl, siloxyl and silazanyl, and X is bonded to a silicon atom of Z;
which method comprises:
reacting a preformed Si—N containing polymer in which the nitrogen atom is bonded to at least two silicon atoms with an alkoxy silyl reactant of the formula:

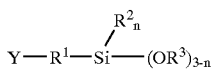

wherein
Y is OH, OCOR$^6$ or NHR$^6$, and R$^6$ is a member selected from the group consisting of hydrogen, C1 to C8 alkyl, C1 to C8 alkenyl, aryl, lower alkoxy, silyl, siloxyl and silazanyl;
R$^1$ is alkylene or alkylene substituted with a heteroatom;
R$^2$ is a member selected from the group consisting of
  (i) hydrogen,
  (ii) hydroxyl,
  (iii) C1 to C10 alkyl, either unsubstituted or substituted with hydroxyl, lower alkoxy, lower alkenyl, silyl and —N(R$^5$)$_2$ where R$^5$ is independently selected from the group consisting of hydrogen, lower alkyl and lower alkenyl,
  (iv) C1 to C10 alkenyl, either unsubstituted or substituted with hydroxyl, lower alkoxy, silyl and —N(R$^5$)$_2$, and
  (v) aryl of 1 or 2 rings, unsubstituted or substituted with hydroxyl, lower alkyl, lower alkenyl, lower alkoxy, silyl and —N(R$^5$)$_2$,
R$^3$ is the same as (iii), (iv) or (v);
n=0, 1 or 2, and wherein the ratio of the total number of OR$^3$ groups of the alkoxy silyl reactant to Si—N bonds of the preformed Si—N bond containing polymer is from about 0.05 to about 2.5.

34. The method of making according to claim 33 wherein the preformed Si—N containing polymer is a member selected from the group consisting of polysilazane, polysiloxazane, block copolymer of a polysilazane and a polysiloxane, a polyureasilazane, a poly(thio)ureasilazane and mixtures thereof.

35. The method of making according to claim 34 wherein the polysilazane is characterized by repeating units of silicon-nitrogen linkages and comprises a reduced amount of silicon-hydrogen bonds relative to the quantity of silicon-hydrogen bonds in a halosilane compound used to prepare said polysilazane.

36. The method of making according to claim 34 wherein the polysilazane comprises a reduced amount of Si—H bonds relative to the quantity of Si—H bonds that are incorporated into the polysilazane from a starting compound comprising at least one Si—H bond and at least one Si-halide bond, said polysilazane further comprising a greater number of Si—N bonds and a greater nitrogen content than would otherwise be derived from complete ammonolysis of the Si-halide bonds of said starting compound.

37. The method of making according to claim 33 wherein the ratio of the total number of OR$^3$ groups of the alkoxy silyl reactant to the Si—N bonds of the preformed Si—N bond containing polymer is from about 0.1 to about 1.0.

38. The method of making according to claim 33 wherein the ratio of the total number of OR$^3$ groups of the alkoxy silyl reactant to the Si—N bonds of the preformed Si—N bond containing polymer is from about 0.1 to about 0.50.

39. A method of coating a substrate, which comprises the steps of:
(I) contacting a substrate with a silicon-containing polymer to provide a coating thereon, said coating comprising an alkoxy silyl substituted polymer of the formula:

Z—A wherein Z is a member selected from the group consisting of a silazane-containing polymer comprising at least one Si—H bond, a siloxazane-containing polymer, a polysilazane-polysiloxane block copolymer, a ureasilazane polymer, a thioureasilazane polymer and a mixture of said polymers, wherein A is an alkoxy silyl group of the formula:

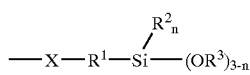

wherein
X is bonded to a silicon atom of Z; X is either O or =NR$^4$ where R$^4$ is a member selected from the group consisting of hydrogen, lower alkyl, lower alkenyl, aryl, lower alkoxy or silyl;
R$^1$ is alkylene or alkylene substituted with a heteroatom;
R$^2$ is a member selected from the group consisting of
  (i) hydrogen,
  (ii) hydroxyl,
  (iii) C1 to C10 alkyl, either unsubstituted or substituted with hydroxyl, lower alkoxy, lower alkenyl, silyl and —N(R$^5$)$_2$ where R$^5$ is independently selected from the group consisting of hydrogen, lower alkyl and lower alkenyl,
  (iv) C1 to C10 alkenyl, either unsubstituted or substituted with hydroxyl, lower alkoxy, silyl and —N(R$^5$)$_2$, and
  (v) aryl of 1 or 2 rings, unsubstituted or substituted with hydroxyl, lower alkyl, lower alkenyl, lower alkoxy, silyl and —N(R$^5$)$_2$,
R$^3$ is the same as (iii), (iv) or (v);
n=0, 1 or 2, and wherein the ratio of the total number of OR$^3$ groups of A to Si—N bonds of Z is from about 0.05 to about 2.5, and
(II) curing the coating on said substrate.

40. The method according to claim 39 wherein the polymer is applied in the form of a solution, said solution comprising at least a compatible solvent.

41. The method according to claim 39 wherein the coating is cured in a moisture-containing atmosphere.

42. The method according to claim 41 wherein the coating is cured at a temperature from about room temperature to about 100° C.

43. The method according to claim 41 wherein the coating is cured at a temperature from about room temperature to about 50° C.

44. The method according to claim 39 wherein the substrate comprises a material selected from the group consisting of metal, glass, ceramic, polymer and combinations thereof.

45. A coated substrate comprising the alkoxy silyl substituted polymer of claim 1.

46. The coated substrate of claim 45 wherein the substrate is comprised of at least one material selected from the group consisting of metal, glass, ceramic and polymer.

47. A substrate coated with the coating composition of claim 29.

48. A coated metal substrate comprising the polymer according to claim 1, wherein said polymer imparts thermal stability and corrosion resistance to said substrate.

* * * * *